United States Patent [19]

van Cooten et al.

[11] Patent Number: 4,704,621
[45] Date of Patent: Nov. 3, 1987

[54] PRINTING DEVICE

[75] Inventors: Robertus van Cooten, Ah Grubbenvorst; Dick Simons, CW Venlo; Bontko Witteveen, EC Venlo; Willem T. Draai, EH Venlo; Johannes G. V. van Stiphout, XE Beek en Donk; Martinus J. Huijben, BC Grubbenvorst, all of Netherlands

[73] Assignee: Oce-Nederland B.V., Netherlands

[21] Appl. No.: 825,044

[22] Filed: Jan. 31, 1986

[30] Foreign Application Priority Data

Feb. 6, 1985 [NL] Netherlands .................. 8500319

[51] Int. Cl.$^4$ ............................................ G01D 15/00
[52] U.S. Cl. .................................. 346/153.1; 346/155
[58] Field of Search ............... 355/14 D, 30 D, 3 CH; 346/134 C, 138, 153.1, 155, 74.5, 160.1; 400/11 T; 101/DIG. 13; 358/300, 301

[56] References Cited

U.S. PATENT DOCUMENTS 4,402,000 8/1983 Fabel et al. ..................... 346/153.1

Primary Examiner—Arthur G. Evans

[57] ABSTRACT

A printing device for recording information in the form of toner images comprising a moveable image-forming medium on a support, the surface of which forms a dielectric layer; an image-forming station disposed along the trajectory of the image-forming medium having a magnetic roller with an electrically conductive nonmagnetic outer sleeve with magnets disposed inside the sleeve; a means for supplying electrically conductive toner particles to a linear zone in the image-forming station; and a plurality of electrodes for generating an electric field corresponding to a desired image pattern, said electrodes extending in the direction of movement of the image-forming medium and disposed so as to be insulated from one another and covered by a dielectric layer wherein each electrode can be actuated by a voltage source and each electrode can generate an electric field across the dielectric layer over part of the zone wherein image formation takes place when in the image-forming station.

19 Claims, 10 Drawing Figures

PRINTING DEVICE

BACKGROUND OF THE INVENTION

1. Field of the Invention

The present invention relates to the field of electrophotographics and more particularly to a printing device for recording information in the form of toner images.

2. Description of the Prior Art

U.S. Pat. No. 3,816,840 describes a printing device for recording information in the form of toner images. In particular, FIGS. 9 and 10 of this patent show a magnetic developing system constructed from a number of permanent magnets having a nonmagnetizable sleeve disposed rotatbly therearound and provided with magnetizable conductive toner. A fixed pin electrode is disposed opposite the toner particles on the sleeve in the recording region. A dielectric layer can be transported over the pin electrode which is always in contact with the pin electrode. A dotted toner image is deposited on the dielectric layer by applying short high voltage pulses (typically 500 to 1000 volts) between the sleeve and the pin electrode. The image dots have dimensions which are substantially equivalent to the size of the area of the pin electrode. By using a large number of such pin electrodes and actuating them with image-forming signals, a dotted toner image can be obtained imagewise on the dielectric layer.

A disadvantage of this printing device is that the image developed in this way has low resolution because recording is possible only in a dot-wise fashion. Also, it is technically very difficult to achieve the required contact between a fixed row of electrodes and a moveable dielectric layer.

U.S. Pat. No. 3,946,402 discloses a device in which a rotating drum is provided with a dielectric layer. A conventional magnetic developing brush is used to apply a uniform toner layer to the dielectric. The uniform toner layer is fed into an image-forming zone formed by a magnetic roller provided with a nonmagnetic sleeve. A large number of magnetic electrically conductive electrodes in the form of bars are disposed on this sleeve. The electrodes extend in a line parallel to the axis of the drum. The electrodes are each connected to a voltage source. If the electrodes are not electrically energized, the magnetic force will pull off the toner from the dielectric layer. Energizing the electrodes, with pulses corresponding to a desired image, forms an electric field across the dielectric layer and fixes the toner dotwise to the dielectric layer. Since the electrodes are conductive, they must be insulated from one another.

A disadvantage of this printing device is that the conductive toner particles may form an electrical connection between individual electrodes so that short circuiting occurs thereby interfering with the formation of a sharp clear image. Also, the construction of a row of conductive magnetic electrodes in bar form is very complex and expensive. U.S. Pat. No. 3,879,737 has the same disadvantages because it uses the same arrangement of magnetically conductive electrodes.

The printing devices of U.S. Pat. Nos. 4,390,887 and 4,394,671 and British Pat. No. 2,076,746 all have a similar problem. The electrically conductive stylus is placed in contact with the conductive toner particles between the surface of the drum and the dielectric layer. Because of this placement an electrical connection may form across the individual electrodes of the stylus so that short circuiting occurs, thereby interfering with the formation of a sharp clear image.

U.S. Pat. No. 3,739,087 and British Pat. No. 1,483,935 although disclosing recording devices cannot be adapted for use with electrically conductive, magnetic toner particles. These devices also have the short circuiting problem mentioned above and are limited to the dot-wise formation of images.

It is, thus, an object of the invention to provide a printing device for recording information in the form of toner images which does not have the above-mentioned disadvantages.

SUMMARY OF THE INVENTION

The present invention relates to a printing device for recording information in the form of toner images comprising a moveable image-forming medium on a support, the surface of which forms a dielectric layer; an image-forming station disposed along the trajectory of the image-forming medium having a magnetic roller with an electrically conductive nonmagnetic outer sleeve with magnets disposed inside the sleeves; a means for supplying electrically conductive toner particles to a linear zone in the image-forming station; and a plurality of electrodes for generating an electric field corresponding to a desired image pattern, said electrodes extending in the direction of movement of the image-forming medium and disposed so as to be insulated from one another and covered by the dielectric layer wherein each electrode can be actuated by a voltage source and each electrode can generate an electric field across the dielectric layer over part of the zone wherein image formation takes place when in the image-forming station.

The advantage of the printing device according to the present invention is that the dielectric layer above each electrode can be developed continuously in the direction of transit of the image-forming medium perpendicular to the magnetic roller. Additionally, in the present invention, the dimensions of the developed image dots can be much smaller than the length of the electrodes or the width of the toner brush at the place of image formation, as will be explained in detail hereinafter.

The electrodes of the present invention, which are substantially of the same width and thickness throughout, are very simple to manufacture. By placing the linear electrodes close together it is possible to form a toner image on the dielectric layer in which it is no longer possible to distinguish a dot or line structure.

In another embodiment of a device according to the present invention, the electrodes on the image-forming medium extend endlessly in the direction of movement of the image-forming medium. These endless electrodes can be actuated by means of induction electrodes placed in registration therewith which are in trailing contact with the dielectric layer. Each of the induction electrodes can be connected to a voltage source.

The advantage of the endless electrodes is that prints can be produced which are longer than the circumference of the image-forming medium. As a result, the image-forming medium and the associated developing device can be made very compact.

The invention and its other advantages will be apparent from the detailed description hereinafter and with reference to the accompanying drawings.

DESCRIPTION OF THE PREFERRED EMBODIMENTS

Figure 1:
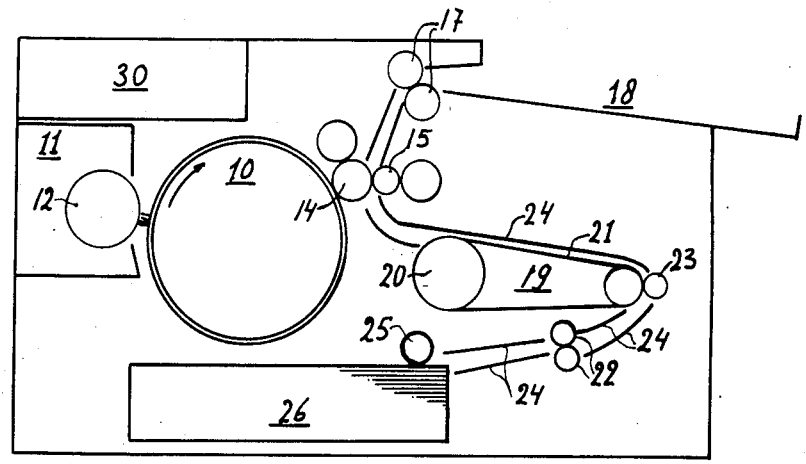
FIG. 1 is a drawing of a typical electrostatic printer using toner particles.

FIG. 1 is a drawing of a typical electrostatic printer. An image-forming medium in the form of a rotating drum 10 comprises an electrostatic layer which is made from a number of actuatable electrodes in and beneath a dielectric layer. Image-forming station 11 with a magnetic developing roller 12 is filled with magnetically attractable conductive toner. A toner image can be formed on the electrostatic layer by the application of a voltage between the actuatable electrodes on rotating drum 10 and developing roller 12. This toner image is transferred to a heated rubber-covered roller 14.

A sheet of paper is fed to paper preheating station 19 from paper stock 26 by means of a roller 25 via guide tracks 24 and rollers 22 and 23. Paper preheating station 19 comprises a belt 21 trained about a heated roller 20. The contact between the sheet and belt 21 causes the sheet to be heated.

The preheated sheet of paper is passed through roller 15 and roller 14 and the toner image formed on roller 14 is completely transferred to the sheet of paper. The paper temperature is such that the toner image fuses on the paper. The sheet of paper is then fed to collecting tray 18 via conveyor rollers 17.

Unit 30 comprises an electronic circuit which converts the optical information of an original into electrical signals which can be fed to the actuatable electrodes to create the desired image. Electrical signals originating from a computer or data-processor can be converted in unit 30 into a signals which can be fed to the actuatable electrodes.

Figure 2:
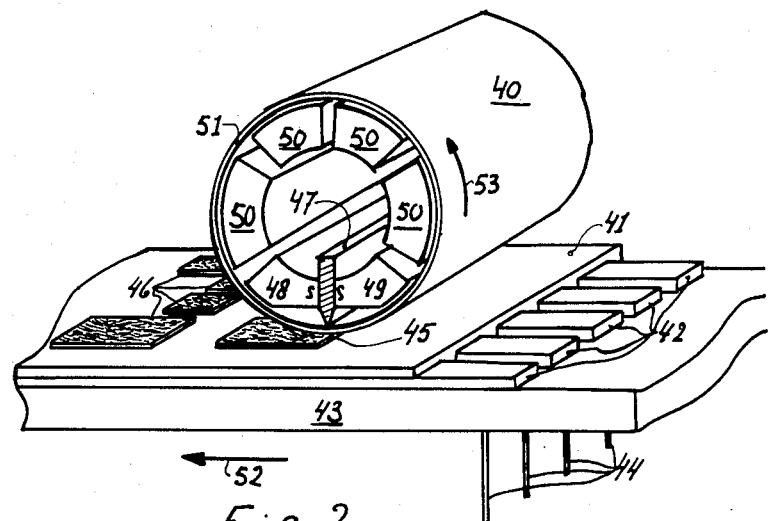
FIG. 2 is a schematic representation of an electrostatic layer and a developing brush of the present invention.

FIG. 2 represents an electrostatic layer with a developing brush in a device according to the present invention. The electrostatic layer is made up of an insulating support 43, a number of electrically conductive electrode paths 42 and a dielectric layer 41. Disposed above the electrostatic layer is an image-forming station wherein electrically conductive magnetic toner particles are fed to image-forming zone 45 located between dielectric layer 41 and developing roller 40.

Support 43 is made from a flexible insulating material, such as Kapton, and has a thickness of about 200 $\mu$m. A copper layer of a thickness of about 5 $\mu$m rest upon insulating support 43. Small tracks of about 20 $\mu$m in width are etched away from the copper layer by means of known exposure and etching techniques, so that a track pattern is obtained consisting of 60 $\mu$m wide electrode paths 42 with 20 $\mu$m interstices. Other widths (from 10 $\mu$m to 200 $\mu$m), thicknesses and interstices (from 5 $\mu$m to 100 $\mu$m) can also be used.

Each electrode path 42 is connected via a lead 44 to a control device (not shown) which can activate each electrode path 42 by applying voltage thereto via switching elements.

A dielectric layer 41 is disposed over and between electrode paths 42. One such dielectric layer 41 is a stove enamel from Messrs. Red Spot Paint and Varnish Corporation, type Red Spot SM 952 R. A solution of this stove enamel in an organic solvent can be applied over the electrodes. After heating, it forms a hard layer. Of course, it is evident to one skilled in the art that other materials may also be used to form a dielectric layer. Such materials as barium titanate, aluminum oxide, titanium dioxide and lead titanate would work quite well.

The electrostatic layer is applied to a metal drum (not shown) and secured thereto by means of a clamp mechanism. In the event of damage to the electrostatic layer, a new one can readily be fitted onto the drum. The drum is provided with an opening in the form of a slot through which leads 44 are taken. Leads 44 connect control circuit 53 and electrode paths 42.

In the case of nonendless electrode paths, the length of electrode paths 42 must at least be equal to the length of the copy to be printed. To obtain a high printing capacity for the device, the time between two printings must be made as short as possible. This can be achieved by securing the electrostatic layer to a drum whose circumference is only a little larger than the length of electrode paths 42. Electrode paths 42 preferably each extend over at least 75% of the drum circumference.

Developing roller 40 rotates in the direction of arrow 53 and is provided with a conducting sleeve 51, preferably copper, of about 50 $\mu$m thick. A plurality of magnets 50 are disposed inside conducting sleeve 51 and are intended to transport the conductive magnetic toner particles applied to sleeve 51 via means not shown to image-forming zone 45. To obtain a sharp boundary at image-forming zone 45, a soft-iron knife 47 is disposed inside sleeve 51 between magnets 48 and 49 having poles of the same sign which are in contact with the knife.

The electrostatic layer is taken past developing roller 40 in the direction of arrow 52. Toner 46 is deposited on dielectric layer 41 by the application of a voltage between one of the electrode paths 42 and conducting sleeve 51. An explanation of how a relatively narrow image-forming zone can be developed with a relatively wide toner brush will now be explained with reference to FIGS. 3a–3d. The reference numerals in these Figures correspond to those used in FIG. 2.

Developing roller 40 is provided with a conductive magnetic toner which touches dielectric layer 41 over an area indicated by broken lines 56 and 57. An electrode path 42 is disposed beneath this layer and can be activated via lead 44, for example, with a positive electrical voltage with respect to the grounded sleeve 51 of developing roller 40. To clarify the image-forming process performed by the present invention, the lower part of FIGS. 3a–3d always show a part of dielectric layer 41 at developing roller 40 in a top plan view 45. The width of top plan view 45 corresponds to the width of one electrode path. Dielectric layer 41 is conveyed past developing roller 40 in the direction of arrow 59.

Figure 3A:
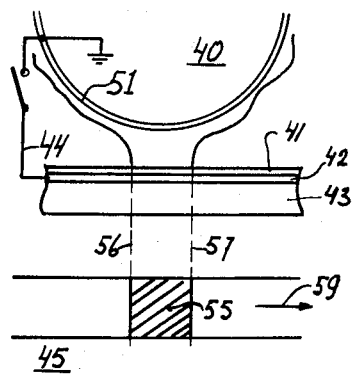
FIGS. 3a–3d are schematic representations of the printing process performed by the present invention.

In FIG. 3a, electrode path 42 is at a positive voltage with respect to conducting sleeve 51. A toner brush current will flow via the electrically conductive toner in the area 55 defined by brush boundary lines 56 and 57, resulting in charge formation on top of dielectric layer 41. This induces an opposite mirror charge in the toner particles which are partially in contact with dielectric layer 41. The electrical force between dielectric layer 41 and the toner particles in an area defined by lines 56 and 57 will become greater than the magnetic force which fixes the toner particles to the magnetic brush thereby attracting the toner particles to dielectric layer 41 and developing area 55. In the case of a dielectric layer with a thickness of 1 μm, about a 30 volt differential appears sufficient to obtain good blackening in area 55.

Figure 3B:
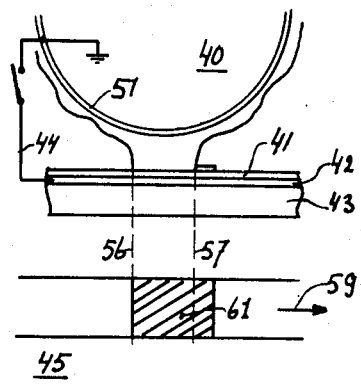
Figure 3C:
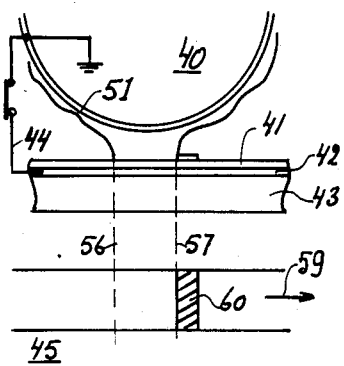
Figure 3D:
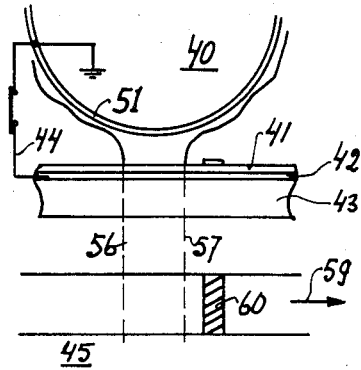

As shown in FIG. 3b, dielectric layer 41 is then conveyed on while the positive voltage is still present on electrode path 42. Development continues normally so that developed area 61 is now wider than the area indicated by brush boundary lines 56 and 57. If electrode path 42 is then electrically connected to the sleeve 51, as shown in FIG. 3c, the charge on dielectric layer 41 will flow off. As a result, the brush current in the area between brush boundary lines 56 and 57 is no longer present and the magnetic force of the magnets in developing brush 40 applied to the toner particles is now greater than the electrical force so that no more toner particles are deposited. The already deposited toner in area 60 located outside brush boundary lines 56 and 57 is no longer attracted by developing brush 40 because the magnetic forces applied to those toner particles have become too small owing to the distance from developing brush 40. Upon further conveyance of the dielectric layer 41 as shown in FIG. 3d, a small area 60 which is narrower than the width of the toner brush is provided with toner.

The narrowness of the toner brush at toner boundary line 57 and the conductivity of the toner are important to the development of short lines or narrow areas such as 60. The conductivity of the toner must be so large that the charge applied to the dielectric rapidly dissipates when electrode path 42 is connected to sleeve 51.

If a positive voltage is applied continuously to an electrode path, a long line is developed. Since the actual width of a developed area above an electrode path is always slightly larger than the electrode path width, typically 60 μm, and since the interstice between two electrode paths is typically about 20 μm, it is possible to develop a fully black area by activating a plurality of adjacent electrodes.

The above-described embodiment is very suitable for the production of prints of restricted dimensions such as size A4 given that the electrode paths must always be somewhat longer than the length of the print. If it is desired to make longer prints, it is possible to select an image-forming drum of a larger diameter. There are limits, however, to the size of the image-forming drum.

A better solution to this problem is obtained if electrode paths 42 in dielectric layer 41 are made endless, totally encircling the drum. A metal drum is provided with an insulating layer to which a large number of endless electrode paths insulated from one another are applied in a known manner. An insulating layer such as the stove enamel is applied over the paths in a manner similar to that described with reference to FIG. 2. If the image-forming drum has a large diameter, the electrode paths can be connected to a control device disposed in the drum, as described in connection with FIG. 2. There is a problem, however, with respect to how the connecting leads from the control device are to be secured to the electrode paths without any discontinuity occurring. To prevent this, an inductive actuation method is utilized to connect the control device to the electrode paths.

Figure 4:
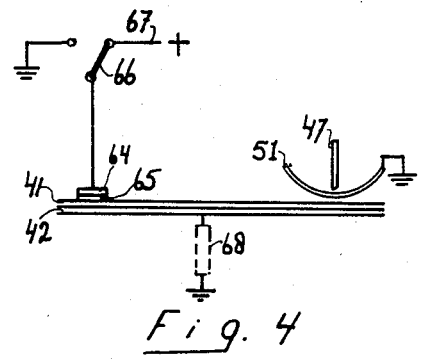
FIG. 4 is a schematic representation of an inductive actuating method for the electrodes.

In FIG. 4, an electrode 42 is covered with a dielectric layer 41. An induction electrode 64 is also provided with a dielectric layer 65. Dielectric layer 41 can be in contact with dielectric layer 65. A rotating sleeve 51 of a magnetic brush 40 is connected to ground potential. Soft-iron knife 47 is disposed in rotating sleeve 51 to form a narrow magnetic field. Electrode 42 can also be connected to ground via a "high" resistance 68.

If induction electrode 64 is now connected, for example, to a positive voltage 67 by means of a switch 66, an electric field will form between induction electrode 64 and electrode 42. Opposite electrode 64 a negative charge will form in electrode 42 and a positive charge will form in electrode 42 opposite to grounded sleeve 51. If a conductive toner layer is present on sleeve 51, this toner will be drawn to dielectric layer 41 by the induction of a mirror charge in the toner, by the positive charge on electrode 42. Image formation thus occurs. If induction electrode 64 is grounded via switch 66, the electric fields will disappear and the magnetic force of the toner brush will hold the toner on the brush.

Figure 5:
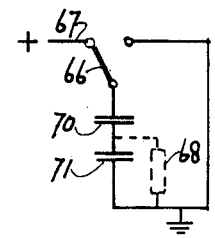
FIG. 5 is an equivalent circuit diagram of the schematic in FIG. 4.

FIG. 5 represents an equivalent circuit diagram of the device shown in FIG. 4. Capacitors 70 and 71 are connected in series and one side is connected to switch 66 while the other side is grounded. Capacitor 70 represents the capacitance which is formed by induction electrode 64 and electrode 42. Capacitor 71 represents the capacitance formed by electrode 42 and grounded sleeve 51 of the developing brush.

The "high" resistance 68 can be connected to the junction of capacitors 70 and 71. When a positive potential 67 is applied to the top plate of capacitor 70, a voltage division will occur over the two capacitors. If capacitors 70 and 71 are of the same size, half the potential will appear at the junction between the two capacitors. The electric fields in the two capacitors 70 and 71 are then equal. By varying the capacitance of capacitor 70, such as by varying the thickness of dielectric layer 41, it is possible to vary the magnitude of the electric field in capacitor 71, and hence the magnitude of the field in the image-forming zone between electrode 42 and sleeve 51, as shown in FIGS. 6 and 7.

Figure 6:
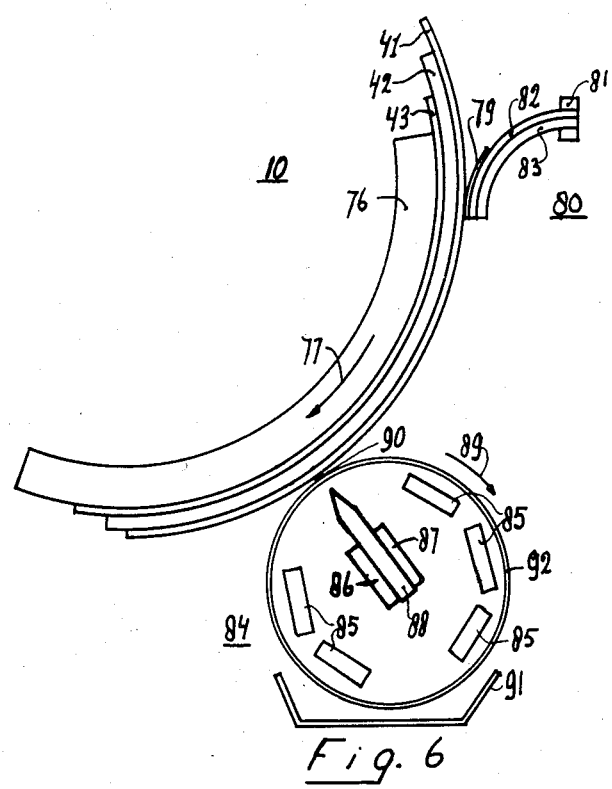
FIG. 6 is a section of another embodiment of a printing device according to the present invention using inductive activation of the electrodes.
Figure 7:
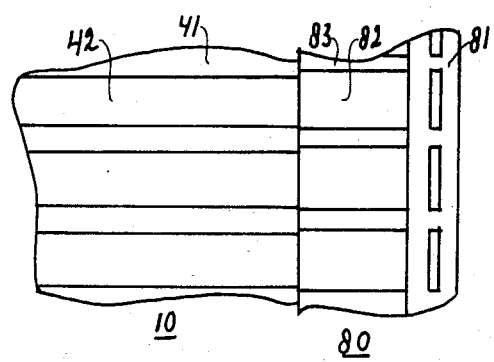
FIG. 7 is a top plan view of the embodiment shown in FIG. 6.

FIG. 6 represents a section through an image-forming medium 10 in the form of a drum 76 rotatable in the direction of arrow 77 and having an insulating layer 43 on which there are disposed a large number of adjacent electrodes 42 which are insulated from one another, extend endlessly in the direction of movement of the drum, and are disposed in and under a dielectric layer 41. Developing device 84 comprises a grounded sleeve 92 which is rotatable in the direction of arrow 89 around an assembly of toner transport magnets 85 and around a soft-iron knife 88 surrounded by two magnets 86 and 87 of the same sign. Conductive magnetic toner is fed from tray 91 to the image-forming zone 90 where a very narrow toner brush is formed.

The soft-iron knife 88 has its pointed end at a distance of about 10 μm from grounded sleeve 92. Grounded sleeve 92 has a thickness of about 50 μm and its outer surface is provided with linear recesses extending parallel to the axis of rotation. The recesses, which are about 5 to 10 μm deep and about 25 μm to 200 μm wide, serve to provide a very thin toner layer on sleeve 92 in cooperation with a dispensing knife (not shown). This structure avoids any accumulation and widening of the toner brush formed in image-forming zone 90.

To obtain a toner brush as narrow as possible, the thickness of sleeve 92 is also important. This thickness is preferably between 10 μm and 100 μm. An optimum compromise between magnetic field dispersal and mechanical strength is obtained with a thickness of about 50 μm.

Induction electrode element 80 comprises a large number of conductive induction electrodes 82 disposed on a flexible insulating strip 83 of Melinex. Each induction electrode 82 is connected via block 81 to a control block (not shown). Good contact between the dielectric layer 41 and induction electrodes 82 is obtained by turning the strip by means of block 81. A thin layer of dielectric material 79, such as the stove enamel already referred to herein can be disposed over and around induction electrodes 82 to increase the wearing resistance of induction electrode element 80.

FIG. 7 represents a part of image-forming element 10 and induction electrode element 80 in a top plan view. Induction electrodes 82 are disposed at the same centers as electrodes 42 on image-forming element 10. Element 80 is so positioned by means of an adjusting device (not shown) such that electrodes 82 and 42 are aligned and are in registration. The width of an induction electrode 82 is preferably the same as, or somewhat larger than, the width of an electrode 42 to obtain the maximum capacitance between the two. For the same reasons, the thickness of dielectric layer 79 is small, being about 1 to 5 μm. The thickness of the induction electrode 82 is about 5 μm and the width 60 to 70 μm.

By applying a voltage of about 50 volts to induction electrode 82 it is possible to deposit sufficient toner on dielectric layer 41 in image-forming zone 90 in the manner described above to obtain good blackening of the image to be printed. Image forming is interrupted when induction electrode 82 is grounded. With the device described above, it is possible to obtain prints having a length greater than the circumference of the image-forming element 10. Image-forming element 10 can accordingly be made with a very small diameter of, for example, 5 cm, thus making it possible to obtain a compact imaging device.

Of course, the invention is not limited to the embodiments described herein. For example, the image-forming medium can first be provided with a uniformly applied layer of toner which is then taken past the image-forming station. If voltage is applied to an electrode path, a brush current will flow and the toner particles will remain fixed to the dielectric layer. When an electrode path is electrically connected to the sleeve, the magnetic brush will pull off the toner particles from the layer and discharge them from the image-forming zone via the rotating sleeve. A scraper device can scrape off the discharged toner particles from the sleeve.

With the inductive actuating method it is possibel to use a very large number of narrow electrode paths on the image-forming medium which correspond to induction electrodes which are many times wider than the electrode paths. This greatly reduces off-line or registration problems.

While presently preferred embodiments of the invention have been described and shown in the drawings with particularity, the invention may be otherwise embodied within the scope of the appended claims.

What is claimed is:

1. A printing device comprising a moveable image-forming medium on a support, the surface of which forms a dielectric layer; an image-forming station disposed along the trajectory of the image-forming medium having a magnetic roller with an electrically conductive nonmagnetic outer sleeve with magnets disposed inside the sleeve; a means for supplying electrically conductive toner particles to a linear zone in the image-forming station; and a plurality of electrodes for generating an electric field corresponding to a desired image pattern, said electrodes extending in the direction of movement of the image-forming medium and disposed so as to be insulated from one another and covered by a dielectric layer wherein each electrode can be actuated by a voltage source and each electrode can generate an electric field across the dielectric layer over part of the zone wherein image formation takes place when in the image-forming station.

2. A device as described in claim 1 wherein each electrode can be connected to a voltage source.

3. A device as described in claim 2 wherein the electrodes each extend over at least 70% of the circumference of the image-forming medium.

4. A device as described in claim 3 wherein the dielectric layer with the electrodes therein is disposed on a thin insulating foil which can be removably secured to the support.

5. A device as described in claim 4 wherein the width of the electrodes is between 10 μm and 200 μm.

6. A device as described in claim 5 wherein the distance between the electrodes is between 5 μm and 100 μm.

7. A device as described in claim 6 wherein the thickness of the dielectric layer is between 1 μm and 5 μm.

8. A device as described in claim 1 wherein each electrode on the image-forming medium extends endlessly in the direction of movement of the image-forming medium, can be connected to a voltage source, and can be actuated by means of induction electrodes which are placed in registration with the electrodes on the image-forming medium, said induction electrodes being in trailing contact with the dielectric layer.

9. A device as described in claim 8 characterized in that a dielectric layer is disposed over and around the induction electrodes.

10. A device as described in claim 9 wherein the width of each induction electrode is substantially the same as, or larger than, the width of an electrode on the image-forming medium.

11. A device as described in claim 10 characterized in that a soft-iron knife with a pointed end is disposed between the same sign poles of two magnets inside a magnetic roller such that the pointed end of the knife is situated near the nonmagnetic outer sleeve.

12. A device as described in claim 11 wherein the outside surface of the sleeve is provided with linear recesses disposed parallel to the axis of rotation.

13. A device as described in claim 12 wherein the induction electrodes are disposed on a flexible insulating strip.

14. A device as described in claim 12 wherein the width of the electrodes is between 10 μm and 200 μm.

15. A device as described in claim 14 wherein the distance between the electrodes is between 5 μm and 100 μm.

16. A device as described in claim 15 wherein the thickness of the dielectric layer is between 1 μm and 5 μm.

17. A device as described in claim 16 wherein the thickness of the nonmagnetic outer sleeve is between 10 µm and 100 µm.

18. A device according to claim 17 wherien the linear recesses have a depth of from 5 µm to 10 µm and a width of from 20 µm to 200 µm.

19. A device as described in claim 10 wherein a stove enamel is used as a dielectric layer.

* * * * *

REEXAMINATION CERTIFICATE (1158th)
United States Patent [19]
van Cooten et al.

[11] B1 4,704,621
[45] Certificate Issued Nov. 14, 1989

[54] PRINTING DEVICE

[75] Inventors: Robertus van Cooten, Grubbenvorst; Dick Simons, Venlo; Bontko Witteveen, Venlo; Willem T. Draai, Venlo; Johannes G. V. van Striphout, Beek en Donk; Martinus J. Huijben, Grubbenvorst, all of Netherlands

[73] Assignee: OCE-Nederland B.V., Venlo, Netherlands

Reexamination Request:
No. 90/001,743, Apr. 3, 1989

Reexamination Certificate for:
Patent No.: 4,704,621
Issued: Nov. 3, 1987
Appl. No.: 825,044
Filed: Jan. 31, 1986

[30] Foreign Application Priority Data

Feb. 6, 1985 [NL] Netherlands .................. 8500319

[51] Int. Cl.⁴ ............................................. G01D 15/00
[52] U.S. Cl. ..................................... 346/153.1; 346/155
[58] Field of Search .................. 346/153.1, 155, 139 C

[56] References Cited
PUBLICATIONS

Japanese Public Disclosure No. 59-224369 dated Dec. 17, 1984 of Patent Application No. 58-98831 with English translation.

*Primary Examiner*—Arthur G. Evans

[57] ABSTRACT

A printing device for recording information in the form of toner images comprising a moveable image-forming medium on a support, the surface of which forms a dielectric layer; an image-forming station disposed along the trajectory of the image-forming medium having a magnetic roller with an electrically conductive nonmagnetic outer sleeve with magnets disposed inside the sleeve; a means for supplying electrically conductive toner particles to a linear zone in the image-forming station; and a plurality of electrodes for generating an electric field corresponding to a desired image pattern, said electrodes extending in the direction of movement of the image-forming medium and disposed so as to be insulated from one another and covered by a dielectric layer wherein each electrode can be actuated by a voltage source and each electrode can generate an electric field across the dielectric layer over part of the zone wherein image formation takes place when in the image-forming station.

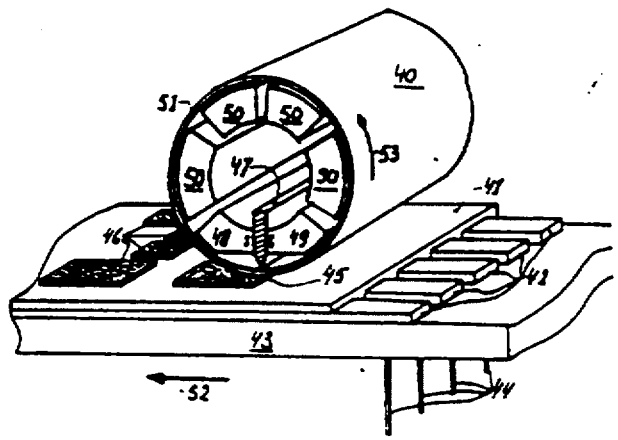

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 14–16 are cancelled.

Claims 1, 3, 5, 8, 11, 13, 17, 18 and 19 are determined to be patentable as amended.

Claims 4, 6, 7, 9, 10 and 12, dependent on an amended claim, are determined to be patentable.

1. A printing device comprising a moveable image-forming medium on a support, the surface of which forms a dielectric layer; an image-forming station disposed along the trajectory of the image-forming medium having a magnetic roller with an electrically conductive nonmagnetic outer sleeve with magnets disposed inside the sleeve; a means for supplying electrically conductive toner particles to a linear zone in the image-forming station; and a plurality of electrodes for generating an electric field corresponding to a desired image pattern, said electrodes extending in the direction of movement of the image-forming medium and disposed so as to be insulated from one another and covered by a dielectric layer wherein each electrode can be actuated by a voltage source [and] *by means of induction electrodes which are placed in registration with the electrodes on the image-forming medium, said induction electrodes being in trailing contact with the dielectric layer such that each electrode can generate an electric field across the dielectric layer over part of the zone wherein image formation takes place when in the image-forming station.*

3. A device as described in [claim 2] *claim 1* wherein the electrodes each extend over at least 70% of the circumference of the image-forming medium.

5. A device as described in [claim 4] *claim 3* wherein the width of the electrodes is between 10 μm and 200 μm.

8. A device as described in claim 1 wherein each electrode on the image-forming medium extends endlessly in the direction of movement of the image-forming medium[, can be connected to a voltage source, and can be actuated by means of induction electrodes which are placed in registration with the electrodes on the image-forming medium, said induction electrodes being in trailing contact with the dielectric layer].

11. A device as described in [claim 10] *claim 1* characterized in that a soft-iron knife with a pointed end is disposed between the same sign poles of two magnets inside a magnetic roller such that the pointed end of the knife is situated near the nonmagnetic outer sleeve.

13. A device as described in [claim 12] *claim 1* wherein the induction electrodes are disposed on a flexible insulating strip.

17. A device as described in [claim 16] *claim 11* wherein the thickness of the nonmagnetic outer sleeve is between 10 μm and 100 μm.

18. A device according to [claim 17] *claim 12* wherein the linear recesses have a depth of from 5 μm to 10 μm and a width of from 20 μm to 200 μm.

19. A device as described in [claim 10] *claim 13* wherein a stove enamel is used as a dielectric layer.

* * * * *